May 17, 1966 F. J. CONSOLI 3,252,020
COOLING MEANS FOR BEARING ASSEMBLIES
Filed Dec. 23, 1963 2 Sheets-Sheet 1
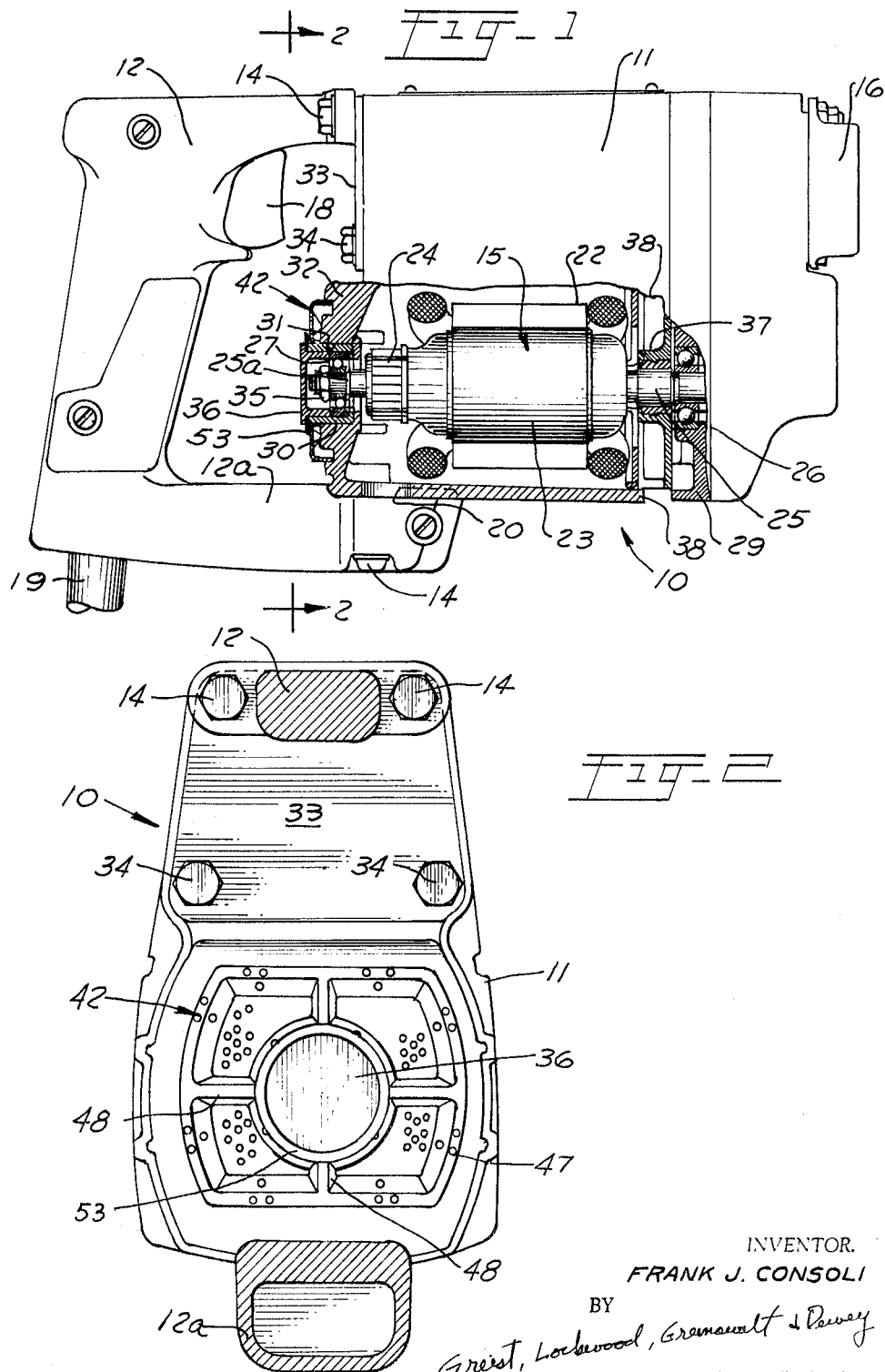
INVENTOR.
FRANK J. CONSOLI
BY
Greist, Lockwood, Greenawalt & Dewey
ATTORNEYS May 17, 1966 F. J. CONSOLI 3,252,020
COOLING MEANS FOR BEARING ASSEMBLIES
Filed Dec. 23, 1963 2 Sheets-Sheet 2
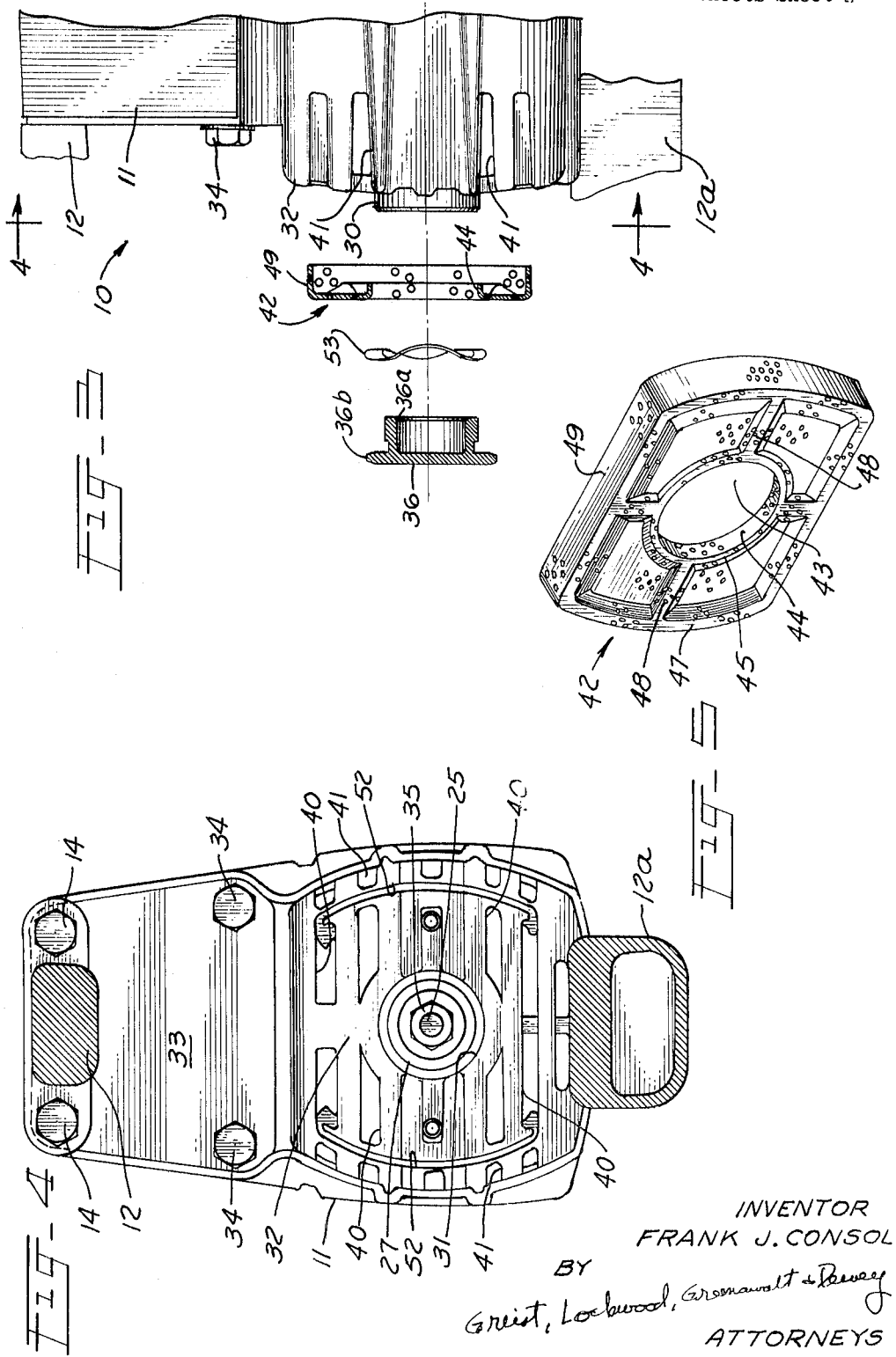
INVENTOR
FRANK J. CONSOLI
BY
Greist, Lockwood, Greenawalt & Dewey
ATTORNEYS United States Patent Office 3,252,020
Patented May 17, 1966

3,252,020
COOLING MEANS FOR BEARING ASSEMBLIES
Frank J. Consoli, Oaklawn, Ill., assignor to Skill Corporation, Chicago, Ill., a corporation of Delaware
Filed Dec. 23, 1963, Ser. No. 332,803
5 Claims. (Cl. 310—64)

This invention relates to power tool construction, and more particularly to new and improved means for cooling a bearing assembly associated with a motor enclosed within a power tool housing formed of material having poor heat conducting properties.

Power tools have been provided with housings or casings of plastic construction to take advantage of the weight saving and low cost properties of plastic materials. In mounting a motor in such a plastic housing, the rotary element of the motor is usually journalled at its ends in metallic ball bearing assemblies which are supported in the walls of the plastic housing. Because of the rather poor heat conducting property of plastic housings as compared with metal housings, these bearing assemblies become quite hot during operation of the motor as the heat generated by the bearings due to friction between their moving parts is not readily transferred to or dissipated by the portion of the plastic housing adjacent the bearing assemblies. As is quite often the case in power tool design, one of these bearing assemblies is supported in an end or exterior wall of the housing which is adjacent the handle and/or operating lever of the tool thereby making it likely for an operator of the tool to sustain an injury by contact of his fingers with this bearing assembly which has become very hot during operation of the tool.

Therefore, it is a primary object of the present invention to provide new and improved means for cooling a bearing assembly which is supported in a housing formed of plastic or other non-metallic material having poor heat conducting properties.

It is another object of the present invention to provide means for cooling a bearing assembly supported in a non-metallic housing, which means are simple to construct, easy to install and do not materially add to the weight or bulk of the power tool.

A further object of the present invention is to provide in a power tool of the type characterized by a vented non-metallic housing wall which supports a ball bearing assembly, a metallic perforated heat dissipating or radiator plate directly connected to the bearing assembly and aligned with the vented wall so that air flowing through the latter cools the radiator plate which in turn cools the bearing assembly.

These and other objects and advantages of the invention will become apparent from the following specification describing a preferred embodiment of the invention which is illustrated in the accompanying drawings.

In the drawings:

FIG. 1 is a partial vertical central section and partial side elevation of a power tool embodying the present invention;

FIG. 2 is an enlarged section taken along line 2—2 of FIG. 1;

FIG. 3 is an enlarged, fragmentary, exploded side elevation of the tool of FIG. 1;

FIG. 4 is a section taken along line 4—4 of FIG. 3; and

FIG. 5 is an enlarged perspective of the metallic radiator plate.

Referring now to the drawings, a power tool, generally designated 10, embodying the present invention will be seen to include a plastic housing or casing 11 having a handle 12 secured thereto in a suitable manner by a number of fasteners 14. The power tool shown for purposes of illustration is of the type adapted to impart combined or selective hammering and rotating movements to a tool element. Power tool 10 includes an electric motor 15 connected in a driving relationship with suitable hammering and rotating means (not shown) which are enclosed in the upper portion of housing 11 and receive a tool element inserted in the housing through a collar member 16 defining the nose of the power tool.

Handle 12 supports a trigger 18 and receives one end of an electric cord 19. Handle 12 is hollow and includes a tubular portion 12a which houses suitable lead wires (not shown) extending through an opening 20 in the base of housing 11 for connecting motor 15 with the trigger switch (not shown) and cord 19 so that actuation of trigger 18 brings about energizing of the electric motor.

Electric motor 15 consists of the usual stator 22 and armature 23 which includes a commutator 24. The armature is mounted on a shaft 25 which has its opposite ends journalled in ball bearing units 26 and 27. The ball bearing units are of known design and of the type including inner and outer races having a plurality of balls rotatably housed therebetween.

Ball bearing unit 26 is supported in a housing wall 29, and bearing unit 27 is secured as by a press fit, for example, within one end of a metal cylindrical bearing member or sleeve 30, which sleeve forms a part of the ball bearing assembly and is secured in an opening 31 of a housing end wall 32 integral with housing 11. Sleeve 30 has one end thereof projecting exteriorly from end wall 32. The rear portion of housing 11 above end wall 32 is closed by a wall plate 33 the upper end of which is secured between handle 12 and casing 11 and the lower end of which is secured to the casing by fasteners 34.

An annular shoulder 25a on the armature shaft and a nut 35 threadingly engageable with the rear end of shaft 25 abut opposite faces of ball bearing unit 27 to prevent relative axial movement between the latter and the armature shaft. A metal cap 36 forming a part of the bearing assembly and having a threaded cylindrical portion 36a threadingly engageable in a complementary threaded portion in the outer end of sleeve 30, encloses the end of the armature shaft and ball bearing unit 27 and may be removed to permit access to nut 35 for motor installation and removal.

A member 37 which includes a number of fan blades is secured on shaft 25 at the portion thereof between the armature and bearing unit 26. Housing 11 includes one or more air inlet openings 38 adjacent fan member 37, and housing end wall 32 includes a plurality of vent openings 40 (FIG. 4) arranged in a pattern around opening 31 in the end wall. A number of additional vent openings 41 (FIG. 3) are formed in the sides of housing 11 adjacent end wall 32. It will be understood that when motor 15 is energized, ambient air is pulled in through openings 38, drawn over motor 15 and forced outwardly through vent openings 40 and 41 by fan member 37 for cooling the motor during operation of the latter.

During operation of motor 15, ball bearing units 26 and 27 become quite warm due to friction between their moving parts and due to the inability of the wall portions of the plastic housing adjacent these bearing units to conduct heat away from the same. During operation of the motor, metal cap 36 becomes quite warm due to its contact with sleeve 30 and the ball bearing unit 27. Because cap 36 is an exposed part and is adjacent the portion of the handle normally gripped by an operator's fingers, it is quite likely that the operator's fingers will come in contact with heated cap 36 and thereby be blistered or burned. The present invention has to do with new and improved means for cooling the entire bearing assembly including cap 36 associated with ball bearing unit 27 so that contact of an operator's fingers with cap 36 during operation of the power tool will not result in an injury being sustained by the operator.

The heat dissipating means for cooling the metallic bearing asembly associated with ball bearing unit 27 comprises a metallic radiator plate, generally designated 42, as best seen in FIG. 5. Radiator plate 42 is preferably a one-piece structure pressed or stamped from a sheet of perforated metal. The formed radiator plate is generally rectangular in over-all shape and includes a central opening 43 defined by an integral cylindrical lip 44 and an annular re-inforcing rib 45. Plate 42 also includes an integral marginal rib 47 joining with annular rib 45 by a plurality of radially extending re-inforcing ribs 48. Radiator plate 42 further includes a continuous marginal flange portion 49 which extends from the same face of the plate containing cylindrical lip 44.

The inside diameter of cylindrical lip 44 is dimensioned for snugly engaging the outer surface of sleeve 30. Radiator plate 42 is attached to the power tool by sliding lip 44 over the end of sleeve 30 which projects from the exterior surface of end wall 32. When radiator plate 42 is fitted to the housing of the power tool in the manner just described, the plate is in alignment or in overlying relation with vent openings 40 in housing end wall 32. The end wall is provided with a pair of arcuate grooves 52 disposed one on each side of opening 31, which grooves are adapted to receive edges of respective side marginal flange portions 49 of plate 42 when the latter is fitted in place against the housing end wall. This engagement between the grooves and flange portions of the radiator plate provides for a more secure mounting of the radiator plate to the power tool housing and prevents the former from being rotated or knocked from its proper place on the power tool housing.

Radiator plate 42 is secured in place on the housing end wall by threadingly engaging cap portion 36a in complementary threads within the outer end of sleeve 30 until cap flange portion 36b engages annular rib 45 of the radiator plate. Preferably, a wavy spring washer 53 is secured between radiator rib 45 and cap flange 36b for preventing the cap from vibrating loose during operation of the power tool.

During operation of motor 15 of the power tool, a substantial amount of heat transferred from ball bearing unit 27 to sleeve 30 and cap 36 is transferred to the radiator plate by reason of the direct contact between cylindrical lip 44 and the outer surface of the exposed end of sleeve 30. In other words, the metallic radiator plate transfers or conducts heat away from sleeve 30 and thereby prevents the latter and cap 36 attached thereto from becoming excessively hot. The radiator plate is rapidly cooled for dissipating the heat transferred from sleeve 30 by the air flow passing through the perforations in the radiator plate, which air flow is produced by fan 37 and passes through vent openings 40 in the tool housing. Therefore, the radiator plate is rapidly cooled by this flow of air thereby allowing the radiator plate to cool or transfer heat from sleeve 30 more rapidly.

Radiator plate 42 is sufficiently effective so that during prolonged use of the tool in ambient air at room temperature conditions, the temperature of cap 36 is held to a level such that if the same is touched by an operator's fingers a blister or burn will not be sustained by the operator.

It should be apparent that the radiator plate of this invention serves as an effective means for cooling the bearing assembly which includes the metallic parts associated with ball bearing unit 27. It should also be apparent that the radiator plate is simple to construct, easy to install and does not materially add to the bulk or weight of the power tool. It should be stated at this point that plate 42 is sufficiently perforated so that it does not materially impede the flow of air through vent openings 40 so as to cause overheating of the tool motor.

While the invention has been shown in but one form it will be obvious to those skilled in the art that it is not to be so limited, but on the contrary it is susceptible of various changes and modifications without departing from the spirit of the invention and the scope of the appended claims. In this connection, it should be noted that although the radiator plate of this invention is shown in association with a bearing unit forming a part of an electric motor, the radiator plate has equal utility with other forms of motors having a rotary element journalled in a bearing unit or assembly which is supported in the wall of a housing enclosing the motor, wherein the housing is formed of material having poor heat conducting properties.

I claim:

1. In a power tool of the type characterized by a housing formed of a material having poor heat conducting properties, which housing encloses a rotary motor having its rotary member journalled at one end thereof in a bearing assembly which is supported in a wall of the housing, wherein said wall is provided with vent openings adjacent said bearing assembly, the improvement which comprises, metallic heat dissipating means disposed adjacent said wall and directly connected to said bearing assembly, said heat dissipating means having at least a portion thereof in alignment with certain of said vent openings for being cooled by the air which passes through the latter thereby to cool said bearing assembly during operation of said motor.

2. In a power tool of the type characterized by a housing formed of a material having poor heat conducting properties, which housing encloses a rotary motor having its rotary member journalled at one end thereof in a bearing assembly which is supported in a wall of the housing, wherein said wall is provided with vent openings adjacent said bearing assembly and wherein the motor includes a fan blade for drawing air through the vent openings for cooling the motor, the improvement which comprises, metallic radiator plate means disposed adjacent the exterior of said wall and directly connected to said bearing assembly, said plate means having a portion thereof in alignment with certain of said vent openings for being cooled by the air drawn through the latter thereby to cool said bearing assembly during operation of said motor.

3. In a power tool of the type characterized by a housing formed of a material having poor heat conducting properties, which housing encloses a rotary motor having its rotary member journalled at one end thereof in a cylindrical bearing assembly which is supported in a wall of the housing, wherein said wall is provided with vent openings adjacent said bearing assembly and wherein the motor includes a fan blade for drawing air through the vent openings for cooling the motor, the improvement which comprises, a metallc radiator plate disposed adjacent the exterior of said wall, said plate being provided with an opening defined by a cylindrical lip which is snugly fitted on said bearing assembly, said plate being perforated and having the portion thereof adjacent said opening in alignment with said vent openings so that air drawn through the latter is also drawn through the perforated plate for cooling the same thereby to cool said bearing assembly during operation of said motor.

4. In a power tool of the type characterized by a housing formed of a material having poor heat conducting properties, which housing encloses a rotary motor having its rotating member journalled at one end thereof in a bearing assembly which is supported in a wall of the housing, wherein said wall is provided with vent openings adjacent said bearing assembly and wherein the motor includes a fan blade for drawing air through the vent openings for cooling the motor, the improvement which comprises, said bearing assembly including an outer cylindrical member having an end portion extending exteriorly of said wall, a metallic radiator plate disposed adjacent the exterior of said wall, said plate being provided with a central opening defined by a cylindrical lip which is snugly fitted on said end portion co-axially with the latter, said plate being perforated and having the portion thereof adjacent said opening in alignment with said vent openings so that air drawn through the latter is also drawn through the perforated plate for cooling the same thereby to cool said bearing assembly during operation of said motor.

5. In a power tool of the type characterized by a housing formed of a material having poor heat conducting properties, which housing encloses a rotary motor having its rotary member journalled at one end thereof in a bearing assembly which is supported in a wall of the housing, wherein said wall is provided with vent openings adjacent said bearing assembly and wherein the motor includes a fan blade for drawing air through the vent openings for cooling the motor, the improvement which comprises, said bearing assembly including an outer cylindrical member having an end portion extending exteriorly of said wall, said wall being provided with a pair of grooves disposed oppositely of said bearing assembly and outwardly of said vent openings, a metallic radiator plate disposed adjacent the exterior of said wall, said plate being provided with a central opening defined by a cylindrical lip which is snugly fitted on said end portion co-axially with the latter, said plate being perforated and having the portion thereof around said opening in alignment with said vent opening so that air drawn through the latter is also drawn through the perforated plate for cooling the same thereby to cool said bearing assembly during operation of said motor and said plate having marginal flange portions received in said grooves, respectively.

No references cited.

ORIS L. RADER, *Primary Examiner.*